United States Patent [19]

Matsui et al.

[11] Patent Number: 4,639,745
[45] Date of Patent: Jan. 27, 1987

[54] OPTICAL RECORDING MEDIUM

[75] Inventors: Fumio Matsui; Shuichi Yanagisawa; Yoshiyuki Kakuta; Atsushi Yoshizawa, all of Saitama, Japan

[73] Assignee: Pioneer Electronic Corporation, Tokyo, Japan

[21] Appl. No.: 690,200

[22] Filed: Jan. 10, 1985

[30] Foreign Application Priority Data

Jan. 11, 1984 [JP] Japan .................................. 59-3118
Jan. 14, 1984 [JP] Japan .................................. 59-5351

[51] Int. Cl.$^4$ ............................................. G01D 15/34
[52] U.S. Cl. .............................. 346/135.1; 346/76 L; 369/288; 430/944; 430/945
[58] Field of Search .................. 346/135.1, 76 L, 137; 430/945, 944; 369/288, 284

[56] References Cited

U.S. PATENT DOCUMENTS

| | | | |
|---|---|---|---|
| 4,230,939 | 10/1980 | de Bont | 346/76 L X |
| 4,335,198 | 6/1982 | Hanada | 346/135.1 X |
| 4,394,661 | 7/1983 | Peeters | 346/135.1 X |
| 4,412,231 | 10/1983 | Namba | 346/135.1 X |
| 4,460,665 | 7/1984 | Kunikane | 346/135.1 X |
| 4,492,750 | 1/1985 | Law | 346/135.1 X |
| 4,529,684 | 7/1985 | Sasagawa | 430/945 X |

FOREIGN PATENT DOCUMENTS 1442087 7/1976 United Kingdom .

Primary Examiner—Joseph W. Hartary
Attorney, Agent, or Firm—Finnegan, Henderson, Farabow, Garrett & Dunner

[57] ABSTRACT

An optical information recording medium comprises a substrate, a first recording layer formed on the substrate, and a second recording layer formed on the first recording layer. The first recording layer comprises a first light-sensitive material that has been dissolved in a solvent that does not adversely affect the substrate. The second recording layer comprises a different light-sensitive material that has been dissolved in a solvent.

4 Claims, 11 Drawing Figures

OPTICAL RECORDING MEDIUM

FIELD OF THE INVENTION

The present invention relates to an information recording medium and, more particularly, to an optical information recording medium having a recording layer sensitive to a laser light.

BACKGROUND OF THE INVENTION

A system is known that records and reproduces video and audio information with the aid of an optical information recording medium having a recording layer sensitive to laser light. In this system, information is recorded in the form of a series of pits that are made on the surface of an optical information recording medium such as an optical recording disk by illumination with a laser beam suitably modulated in response to an information signal.

A cross section of the conventional optical information recording medium is shown in FIG. 1. A substrate 1 is made of a material selected from among glass, acrylic resins, vinyl resins, polyether resins, epoxy resins, polycarbonate resins, polybutyral resins, cellulose acetate butyrate resins, and nitrocellulose resins. That substrate 1 is overlaid with a recording layer 2 in the form of a thin film that is made of a material which, when heated by a laser light, sublimes to leave a pit in its surface. An example of the material that sublimes upon scanning with a laser beam is a dye sensitizer and a binder (e.g. nitrocellulose) dissolved in a solvent such as ketone.

A recording layer having a uniform thickness is provided by a spin coating technique. Under this method, while the substrate is rotated about its axis at a speed of preferably from 200 to 250 rpm, a solution of a light-sensitive material for making the recording layer 2 is dripped onto the substrate through a nozzle slowly moving in the radial direction. After the dripping is discontinued, the rotating speed of the substrate 1 is increased to, preferably 400 to 1000 rpm so as to spin off the excess solution and to provide the substrate 1 with a uniform layer of solution that contains the light-sensitive material. Subsequently, the solution layer is dried to evaporate the solvent and form the desired recording layer 2.

It has been found to be difficult to use a single light-sensitive material to obtain a recording layer that exhibits good sensitivity characteristics with a laser light having a certain wavelength. In order to overcome this difficulty, a recording layer made of a mixture of two or more light-sensitive layers has been proposed. However, this idea suffers from the problem of there being a small latitude in the selection of light-sensitive materials because the solution with which the substrate is to be spin coated must be prepared using a solvent that is miscible with all the light-sensitive materials used. Another requirement that must be considered is that the miscible solvent used should not dissolve, swell, or cause otherwise adverse effects on the substrate 1. This consideration puts strict limitations on the usable combinations of light-sensitive materials and solvents.

The use of a thin film containing an organic dye, especially a cyanine dye, as the recording layer on an optical disk is shown in Japanese Published Patent Application Nos. 114989/1983 and 112790/1983, and Japanese Patent Application No. 210077/1983. Optical disks incorporating this idea are shown in FIG. 4.

A substrate 11 formed in a disk shape from acrylic acid resins such as polymethyl methacrylate (PMMA) by the P.P. (Photo-Polymer) method or injection method is provided with fine grooves either in the form of concentric circles or in a helix (the grooves are hereunder referred to as guide tracks).

In the cleaning step, any dirt present is removed from the surface of the substrate 11. A solution of a cyanine dye is spin coated onto the guide tracks on the substrate 11 to form a uniform coating. In the subsequent baking step, the coated surface is dried to form recording layer 12. A protective PMMA plate 14 is bonded to the recording layer 12 on the substrate 11, with a spacer 16 being interposed to form a gap 13. A cross section of the optical disk is shown in FIG. 2. A double-side optical disk using two substrates 11 each having a recording layer 12 as shown in FIG. 3 has also been proposed.

The spin coating method is performed in the above-described manner. While the substrate 11 is rotated about its center at a speed of 200 to 250 rpm, a solution of cyanine dye is dripped onto the substrate through a dispenser slowly moving in the radial direction. After the dripping is stopped, the rotating speed of the substrate 11 is increased to 400 to 1000 rpm so as to spin off the excess solution and to provide the substrate with a uniform layer of the solution.

The recording layer 12 on the conventional optical disk is a thin film of a cyanine dye and has a bronze-like or metallic gloss suitable for reflecting a laser light in the reproduction mode. The thin film of cyanine due sublimes by absorbing a specific wavelength component of the laser light, thus also working as a recording layer wherein pits are formed by illumination with the laser light in the recording mode. The thin film of cyanine dye is flexible and it has been confirmed that unlike metal films, this film is less likely to develop cracks even if temperature changes occur. Because of these advantages, the conventional optical disk uses a thin film made of a single cyanine dye component.

However, most of the solvents capable of dissolving cyanine dyes are ketone compounds which dissolve the PMMA that is extensively used as a substrate material. Stated more specifically, when a solution of a cyanine dye in a ketone solvent is spin coated onto a PMMA substrate with guide tracks, the solution swells or dissolves its surface, and the resulting thin film of cyanine dye does not have the desired metallic gloss. Therefore, a recording layer in the form of a thin film of a single cyanine dye component has not been suitable for use with commercial optical disks.

OBJECTS AND SUMMARY OF THE INVENTION

An object of the present invention is an optical information recording medium with good sensitivity characteristics with respect to laser light.

Another object of the present invention is an optical information recording medium including a lamination of at least two layers made of different light sensitive materials.

A further object of the present invention is an optical information recording medium with a high metallic gloss.

Still another object of the present invention is an optical information recording medium having high resistance to moisture contamination and weathering.

Yet another object of the present invention is an optical information recording medium made with compatible light-sensitive materials and substrate material.

These and other objects are accomplished by an optical information recording medium comprising a substrate and a plurality of superimposed recording layers thereon, the recording layers including two adjacent layers comprised of different high-sensitive materials.

A further aspect of the present invention is an optical information recording medium comprising a substrate made of an acrylic acid resin, a first recording layer formed on the substrate and being composed of a water-soluble cyanine dye and a second recording layer formed on the first recording layer and being composed of a water-insoluble cyanine dye.

BRIEF DESCRIPTION OF THE DRAWINGS

The manner in which the above and other objects, features, and advantages of the present invention are achieved will become more apparent from the following detailed description when considered in view of the drawings, wherein.

DETAILED DESCRIPTION

Figure 5:
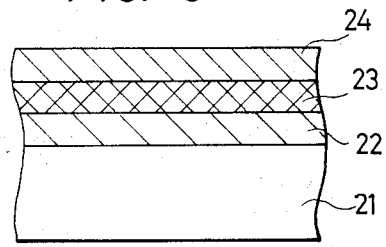
FIG. 5 is a partial cross section of an optical information recording medium of the present invention.

FIG. 5 shows a cross section of the information recording medium according to the present invention. A substrate 21 is made of a material selected from among glass, acrylic resins, vinyl resins, polyether resins, epoxy resins, polycarbonate resins, polybutyral resins, cellulose acetate butyrate resins, and nitrocellulose resins. A first recording layer 22 is formed on the substrate 21. The layer 22 is a thin film made by spin coating an IR and UV absorbing material A. A second recording layer 23 is formed on the recording layer 22. The layer 23 is a thin film made by spin coating a near IR absorbing material B. A third recording layer 24 may be formed on the recording layer 23. The layer 24 is a thin film made by spin coating the IR and UV absorbing material A, i.e. the same material as the layer 22.

The layers 22, 23 and 24 are placed sequentially on the substrate. First, an IR and UV absorbing material, dissolved in solvent a that will not attack the substrate 21, is spin coated onto the substrate. The recording layer 22 is formed after the solvent a dries. Then, a near IR absorbing material B, that does not attack the layer 22, is spin coated thereon. The recording layers 23 is formed after the solvent b dries. Finally, the recording layer 24 is formed by the method used in forming the layer 22. For example, in the case of PMMA used as the substrate 21, nitrocellulose is used as the layers 22 and 24 and Indocyanine Green dissolved in methanol is used as the layer 23. Alternatively a nickel complex of benzendithiol is used as the layers 22 and 24 and Indocyanine Green dissolved in water is used as the layer 23.

Since, the two layers of the IR and UV absorbing material A sandwich the layer of near IR absorbing material B, the shape of a pit left in the first layer after sublimation of material A complements the shape of a pit left in the second layer after sublimation of material B. The overall configuration of the layers at the boundary between pits and the adjacent intact area will not be greatly influenced by the noise component of the wavelength of the laser light used. As a result, noise-free reproduction of the intended information can be accomplished. Needless to say, every two adjacent recording layers in the medium of the present invention are made of different light-sensitive materials which are dissolved in different solvents and applied by spin coating.

Figure 1:
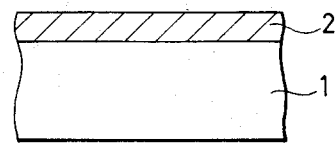
FIG. 1 is a partial cross section of a conventional optical information recording medium.
Figure 2:
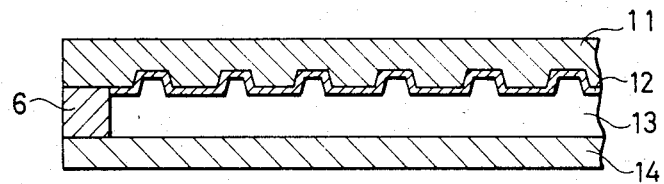
FIG. 2 is a partial enlarged cross section of a conventional optical disk.
Figure 3:
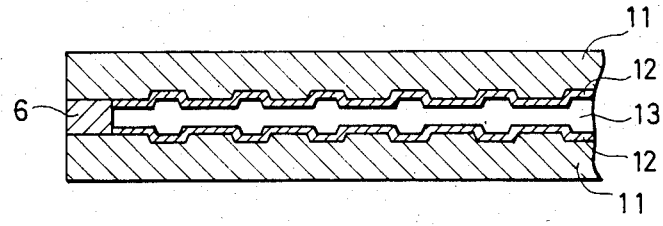
FIG. 3 is a partial enlarged cross section of a conventional double-sided optical disk.
Figure 4:
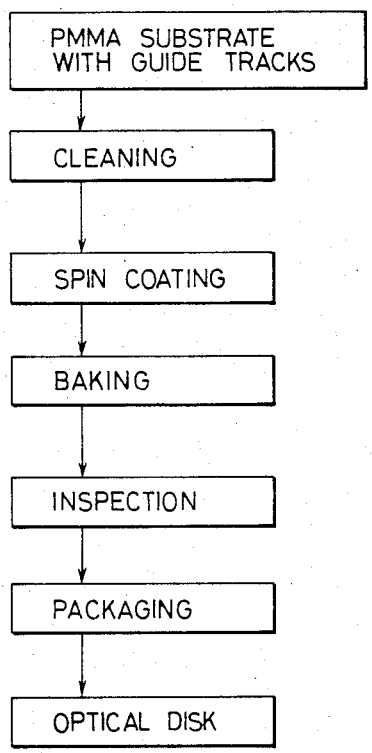
FIG. 4 is a flowchart of the process for the production of a conventional optical disk.

In the embodiment shown above, IR and UV absorbing materials are used as the light-sensitive material. If desired, each recording layer may be made of a single material having not only light sensitivity but also resistance to water, and weathering. Alternatively, a composite made of materials having such properties may be used. Preferably, a light-sensitive material having resistance to water, and weather is used to form layers which, as in the case of the layers 22 and 24 in FIG. 2, sanwich the recording layer 23.

Figure 6A:
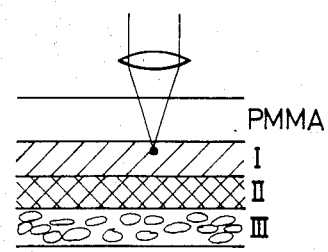
FIGS. 6A and 6B illustrate the light transmittances of layers of light-sensitive materials used in an embodiment of the present invention.
Figure 6B:
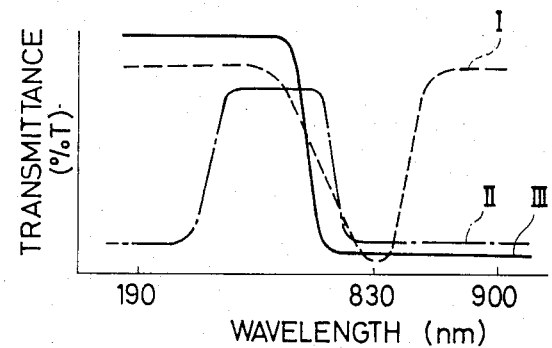

When three light-sensitive materials (I), (II) and (III) having different laser light transmittances (I), (II) and (III) shown in FIG. 6B are used, these light-sensitive materials are spin coated in layers on the substrate 21 using different solvents for the respective materials.

FIG. 6A shows a cross section of the optical disk of the present invention. As shown in FIG. 6A, the light-sensitive material (I) is coated on the substrate 21 and the light-sensitive layers (II) and (III) are laminated on the coated layer (I). When a laser light having a wavelength of about 830 nm irradiates such a disk, the light-sensitive material (I) extinguishes the laser light, then the sensitive layer is reformed. Similarly, the light-sensitive materials (II) and (III) extinguish the laser light transmitted from the layer (I) and are reformed. As shown in FIG. 6B, all materials (I) to (III) are the most sensitive to laser light having a wavelength of near 830 nm. The ratio of energy trap reaches a peak under this condition.

The degree of sensitivity of the layers is in proportion to the power of the irradiated laser light. The most affected layer is the layer (I), since the layer (I) is located at the outer surface of the three layers. The degree of sensitivity of layer (II) is greater than that of the layer (III). In irradiated three layers, all materials are excited and the first layer (I) is sublimated before the layers (II) and (III).

The sensitivity characteristics of three materials complement each other to provide good overall characteristics with a laser light having a wavelength of, about, 830 nm. Stated more specifically, recording layers having the sensitivity characteristics (II) and (III) are insensitive to a low frequency laser light.

A pit left in the recording layer with the sensitivity characteristic (I) after sublimation of the light-sensitive material has a somewhat deformed boundary with the intact area. The unaffected layers (II) and (III) compensate for this deformation, providing a sharp pit through the three recording layers.

For example, if the material (I) is not watertight, materials that are watertight are applied for layers (II) and (III). If the material (I) has a low resistance of IR, materials having a high resistance of IR are applied for the layers (II) and (III).

Furthermore, if each recording layer in a disk has a specific light-sensitive characteristic, when laser light having one wavelength irradiates the disk, one layer is affected by the laser light. Laser light A only affects the layer (I) and irradiates the layer (I) in order to form pits. Laser light B only affects the layer (II) and irradiates the layer (II) in order to form pits. Accordingly, a double recorded layer in which each layer is recorded with different information is available by the present invention.

Figure 7A:
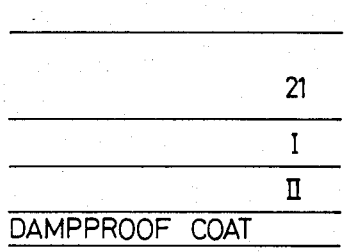
FIGS. 7A and 7B illustrate the light transmittances of layers of light-sensitive materials used in another embodiment of the present invention.
Figure 7B:
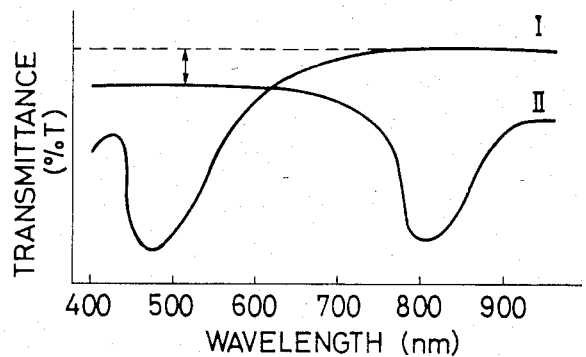

FIG. 7A shows a cross section of the optical disk of the present invention. The disk has the layer (I) made of N-ethyl-N-oxyethylaniline and nitrocellulose, the layer (II) made of Indocyanine Green, and the layer (II) having a good watertight characteristic. The laser light transmittance of each layers (I) and (II) is shown in FIG. 7B.

Figure 8:
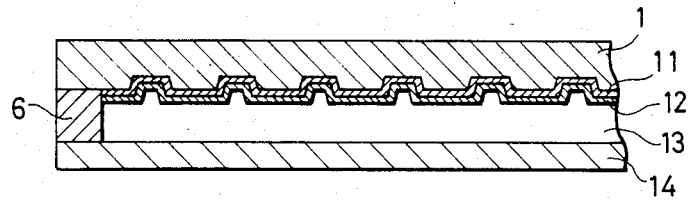
FIG. 8 is a partial enlarged cross section of an optical disk constructed with the optical information recording medium of the present invention.

FIG. 8 shows a cross section of an optical disk made with the medium of the present invention. The disk has a first recording layer 11 made of a water-soluble cyanine dye and a second recording layer 12 made of a water-insoluble cyanine dye. The process for producing this disk starts with providing these two cyanine dyes. It has been shown that good results are obtained by using Indocyanine Green (Compound No. 4839, Merck Index, 9th ed.) as the water-soluble cyanine dye for making the first recording layer Indocyanine Green works as a recording material by itself and is insoluble in ketone solvents. In the embodiment shown, 2–5 mg/cc of indocyanine is dissolved in methanol at room temperature. The water-insoluble cyanine dye for making the second recording layer may be a conventional one selected from, for example, those listed in Japanese Published Patent Application Nos. 114989/1983 and 112790/1983. Such dyes are used as they are dissolved in cyclohexane. Tripentane or diacetone alcohol may also be used as the solvent.

Figure 9:
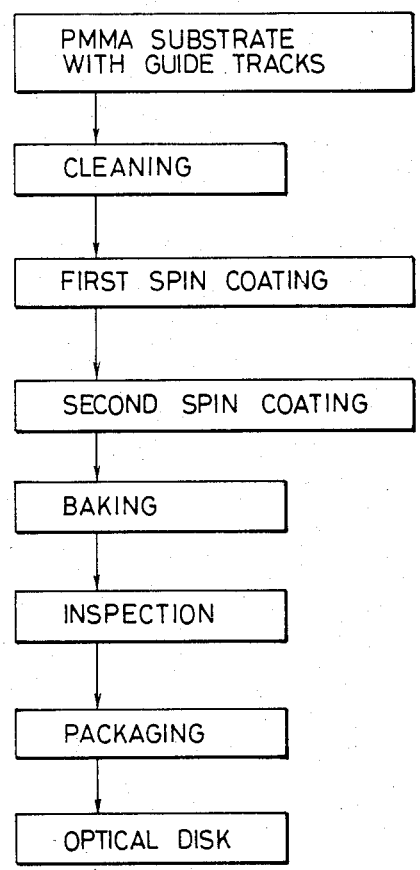
FIG. 9 is a flowchart illustrating the steps in the process for production of the optical disk of FIG. 8.

The optical disk of the present invention shown in FIG. 8 may be manufactured by the process shown in FIG. 9. In the cleaning step, any dirt present is removed from the surface of a PMMA substrate 11 with guide tracks. In the first spin coating step, a preliminarily prepared solution of Indocyanine Green in methanol is dripped onto the substrate 11 while rotating at 250 rpm. The rotating speed of the substrate is increased to 1000 rpm so as to spin off the excess solution and to form a uniform layer of the solution. The methanol is evaporated to from the first recording layer.

In the second spin coating step, a solution of a water-insoluble cyanine dye in cyclohexane is dripped onto the first recording layer rotating at a reduced speed of 250 rpm and, subsequently, the rotating speed is increased to between 400 and 1000 rpm so as to spin off the excess solution and to form a uniform thin film from which the second recording layer is to be made. In the baking step, the assembly is dried to form a lamination of the first and second recording layers. After inspection, the unit is sent to the packaging step wherein the recording layers are protected with a plate 14, with a spacer being inserted between the protector 14 and the second recording layer. As a result of this procedure, the desired optical disk is obtained.

The water-soluble cyanine dye such as Indocyanine Green protects the surface of the PMMA substrate 1 from cyclohexane. Therefore, the solution of water-insoluble cyanine dye can be applied to form the second recording layer without adversely affecting the substrate surface, and at the same time, the first recording layer is protected by the second layer. The thickness of each recording layer is controlled in the spin coating steps in consideration of the required moisture resistance. Preferably, the second recording layer made of the water-insoluble cyanine dye is made thicker than the first layer.

In the embodiment shown, the substrate is made of PMMA, but it should be understood that other materials may be used and suitable examples include glass, acrylic resins, vinyl resins, polyether resins, epoxy resins, polycarbonate resins, polybutyral resins, cellulose acetate butyrate resins and nitrocellulose resins.

As shown above, according to the present invention, a plurality of light-sensitive materials which are conventionally difficult to be formed in thin films due to the absence of solvents miscible with all these materials are laminated to form a thin film. By so doing, a unit of recording layers that is immune to the noisy wavelength component of a laser light and which exhibits sharp overall absorption characteristics for a predetermined wavelength component can be produced. The present invention also permits the conjoint use of materials having resistance to UV rays, IR rays, water, solvents and weathering, and these materials complement each other to provide further enhanced overall performance characteristics. This enables the provision of an information recording medium that experiences minimum deterioration due to extraneous light incident after the recording step. As a further advantage, if the bottommost recording layer, which is in direct contact with the substrate, is made of a light-sensitive material that dissolves in a solvent which causes no adverse effects on the substrate, the layers to be formed on said bottommost layer may be composed of a light-sensitive material that is soluble in solvents which may adversely affect the substrate. For example, the surface of a substrate which is typically made of PMMA vulnerable to organic solvents such as ketone solvents is protected by the first recording layer made of a water-soluble cyanine dye. The first recording layer is overlaid with the second layer made of a water-insoluble cyanine dye. Thus, the information recording medium of the present invention has high moisture resistance, exhibits consistent performance over an extended period, and allows a greater freedom in selecting suitable light-sensitive materials.

What is claimed is:

1. An optical information recording medium comprising:
   a substrate;
   a first recording layer of a first light-sensitive material on said substrate; and
   a second recording layer of a second light-sensitive material on said first recording layer, said second light-sensitive material being different from said first light-sensitive material, wherein said first light-sensitive material is nitrocellulose and said second light-sensitive material is Indocyanine Green.

2. An optical information recording medium comprising:
- a substrate;
- a first recording layer of a first light-sensitive material on said substrate; and
- a second recording layer of a second light-sensitive material on said first recording layer, said second light-sensitive material being different from said first light-sensitive material, wherein said first light-sensitive material is a nickel complex of benzendithiol and said second light-sensitive material is Indocyanine Green.

3. An optical information recording medium, comprising:
- a substrate of an acrylic acid resin;
- a first recording layer formed on said substrate and made of a water-soluble cyanine dye; and
- a second recording layer formed on said substrate and made of a water-insoluble cyanine dye.

4. An optical information recording medium according to claim 3, wherein said water-soluble cyanine dye comprises Indocyanine Green.

* * * * *